(12) United States Patent
Cox et al.

(10) Patent No.: US 8,040,958 B2
(45) Date of Patent: Oct. 18, 2011

(54) METHOD FOR MEASURING CORRELATION BETWEEN FREQUENCY RESPONSE FUNCTIONS

(75) Inventors: Jared S. Cox, Marysville, OH (US); Charles Gagliano, Hilliard, OH (US)

(73) Assignee: Honda Motor Co., Ltd, Tokyo (JP)

( * ) Notice: Subject to any disclaimer, the term of this patent is extended or adjusted under 35 U.S.C. 154(b) by 945 days.

(21) Appl. No.: 11/681,364

(22) Filed: Mar. 2, 2007

(65) Prior Publication Data
US 2008/0215281 A1  Sep. 4, 2008

(51) Int. Cl.
H04L 27/00  (2006.01)

(52) U.S. Cl. .......................................... 375/259; 327/1

(58) Field of Classification Search ............... 178/66.1; 327/1, 100; 375/259
See application file for complete search history.

(56) References Cited

U.S. PATENT DOCUMENTS

| | | | |
|---|---|---|---|
| 3,828,154 A | 8/1974 | Fabricius et al. | |
| 3,992,206 A | 11/1976 | Lamberts | |
| 4,885,708 A | 12/1989 | Yamaguchi et al. | |
| 5,166,941 A | 11/1992 | Hackel | |
| 5,633,893 A | 5/1997 | Lampe et al. | |
| 5,801,871 A | 9/1998 | Madabhushi | |
| 5,848,172 A | 12/1998 | Allen et al. | |
| 5,937,006 A * | 8/1999 | Clark et al. | 375/224 |
| 6,041,077 A * | 3/2000 | Clark et al. | 375/224 |
| 6,064,694 A * | 5/2000 | Clark et al. | 375/224 |
| 6,092,429 A | 7/2000 | Cunningham et al. | |
| 6,151,399 A | 11/2000 | Killion et al. | |
| 6,466,680 B1 | 10/2002 | Gelow et al. | |
| 6,513,622 B1 | 2/2003 | Gelow et al. | |
| 6,671,501 B1 | 12/2003 | Dalichau | |
| 6,763,310 B2 | 7/2004 | Lafleur et al. | |
| 6,799,126 B1 | 9/2004 | Ratcliffe et al. | |
| 6,810,741 B1 | 11/2004 | Lafleur et al. | |
| 7,053,709 B1 * | 5/2006 | Darvish-Zadeh et al. | 330/149 |
| 7,548,071 B2 * | 6/2009 | Harrison et al. | 324/617 |
| 2002/0138164 A1 * | 9/2002 | David | 700/94 |
| 2005/0094829 A1 * | 5/2005 | Cordell | 381/103 |
| 2006/0046659 A1 * | 3/2006 | Haartsen et al. | 455/67.11 |
| 2006/0047794 A1 * | 3/2006 | Jezierski | 709/221 |
| 2006/0072485 A1 * | 4/2006 | Cairns et al. | 370/290 |
| 2007/0032890 A1 * | 2/2007 | Zhou et al. | 700/63 |
| 2007/0194796 A1 * | 8/2007 | Harrison et al. | 324/534 |
| 2007/0297529 A1 * | 12/2007 | Zhou et al. | 375/267 |
| 2008/0186082 A1 * | 8/2008 | Singh et al. | 327/539 |
| 2009/0091275 A1 * | 4/2009 | Miller et al. | 318/127 |

* cited by examiner

Primary Examiner — Dac Ha
Assistant Examiner — Erin File
(74) Attorney, Agent, or Firm — Mark Duell; Michael A. Forhan; Eley Law Firm Co. LPA

(57) ABSTRACT

A method for measuring correlation between frequency response functions. A first frequency response function and a second frequency response function are acquired. The amplitude of the first and second frequency response functions are tabulated at a plurality of corresponding, predetermined frequencies. Amplitude and shape correlations between the first and second frequency response functions are then computed. The computed amplitude and shape correlations provide an indication of the degree of correspondence between the first and second frequency response functions, and can be used to compute a frequency response index that is an objective measure of the overall correspondence between the first and second frequency response functions.

19 Claims, 3 Drawing Sheets

METHOD FOR MEASURING CORRELATION BETWEEN FREQUENCY RESPONSE FUNCTIONS

FIELD

The present invention relates generally to computer simulations. In particular, the present invention relates to a quantitative measure of the degree of correlation between a computer-simulated test result and an actual test result.

BACKGROUND

A computer simulation is a computer program which attempts to reduce the physical characteristics of an object, part, article, component, specimen, device or system (generally termed hereinafter "item") to a virtual model comprising algorithmic and/or mathematical logic. A second set of algorithmic or mathematical logic representing physical stimuli are applied to the virtual model. The virtual model's response to the stimuli represents a prediction of how a physical specimen of the item would react to similar stimuli. Various commercial products are available to perform computer simulations including, among others, NASTRAN, which was developed at NASA and is widely used by industry; ANSYS, provided by ANSYS, Inc.; ABAQUS, provided by ABAQUS, Inc; and ALGOR, provided by ALGOR, Inc.

Computer simulations are particularly useful as design tools because they allow the characteristics of an item to be studied without generating a physical specimen of the item. Since no physical specimen is required, the characteristics of the item can be rapidly evaluated and altered, thereby providing designers with the ability to efficiently optimize the item. For example, a finite element analysis (FEA) simulation can provide a prediction of the stresses and stress distribution of a support beam under a certain load. This computed information can then be used to determine whether the design of the beam is adequate for its intended use.

Another common type of computer simulation is vibration simulation wherein a virtual model of an item is analyzed to predict how the item will function when subjected to various types of vibration, such as random vibration and sinusoidal vibration, over a range of frequencies. Vibration analysis can also be employed to determine resonant frequencies of the item. If the resonant frequencies are within the range of vibrations occurring in the expected operating environment of the item, then its design can be altered to forestall potential operational and reliability issues. For example, a position light mounted to a wing of an aircraft can be modeled and a simulation performed to study the stresses imposed upon it by vibrations in the wing. The resulting analysis can provide insight into, for instance, whether those vibrations will lead to premature failure of incandescent lamps used in the position light, or cause resonances that could lead to structural failure of the light's mounting points.

An important and often-overlooked aspect of computer simulation is consideration of how accurately the simulation predicts the characteristics of a physical specimen of the item. Without a comparative review of the prediction against actual test data for a physical specimen, a latent defect in an item's design may not manifest itself until the item has already been placed into service, with the result that the item may not have the desired performance or reliability. It is therefore desirable to validate the computer virtual model by obtaining a measure of the correlation of two frequency response functions (FRF), i.e., a comparison of actual test data to a computer simulation, in order to determine how accurately the simulation predicts the actual test result. A frequency response assurance criterion (FRAC) is typically used in the art to measure this correlation. However, FRAC focuses on the frequency of peaks in the curves and does not take into account the shape and amplitude of FRF curves. For example, FRAC correlation typically expands one or both of the frequency response functions being compared in order to line up their frequency peaks, thus distorting the shape information. In addition, FRAC does not take into account amplitude differences between the functions. As a result of these shortcomings, the FRAC correlation data may not be sufficiently accurate to determine how accurately the simulation predicts real-world performance. There is a need for a way to measure the correlation between two frequency response functions with greater accuracy than is presently available in the art.

SUMMARY

The disclosed invention provides a frequency response index that takes into account the overall shape and amplitude of frequency response functions when determining the degree of correlation between the functions. The frequency response index accordingly provides a more accurate indication of the degree of correlation between the frequency response functions. This allows for increased accuracy in the rendering of virtual models used for computer simulation, and is intended to result in simulations having greater accuracy.

One aspect of the present invention is a method for measuring correlation between frequency response functions. The method comprises the steps of acquiring a first frequency response function and a second frequency response function, and tabulating the amplitude of the first and second frequency response functions at a plurality of corresponding, predetermined frequency data points. Amplitude and shape correlations between the first and second frequency response functions are then computed. At least one of the computed amplitude and shape correlations may be output in a tangible and/or an electronic form. The computed amplitude and shape correlations provide an indication of the degree of correspondence between the first and second frequency response functions, and can be used to compute a frequency response index that is an objective measure of the overall correspondence between the first and second frequency response functions.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

The present invention discloses a frequency response index (FRI) that provides an objective measure of the degree of correlation between two frequency response functions. The FRI can be used to validate a virtual model used for a computer simulation and provide a confidence factor with regard to the simulation results.

The FRI is expressed by Equation 1:

$$FRI = \frac{w_a}{2w_t}\alpha(x,y) + \frac{w_s}{2w_t}\rho(x,y) \qquad \text{Equation 1}$$

$\alpha(x,y)$ is expressed by Equation 2:

$$\alpha(x,y) = 1 - \left|\frac{10}{S_{dB}}\log_{10}\frac{Y_T}{X_T}\right| \qquad \text{Equation 2}$$

and $\rho(x,y)$ is expressed by Equation 3:

$$\rho(x,y) = \frac{\text{Cov}(x,y)}{\sigma_x \sigma_y} \qquad \text{Equation 3}$$

The variables of Equations 1-3 are defined as follows:

$$X_T = \sum_1^n x_i^2$$

$$Y_T = \sum_1^n y_i^2$$

$$w_t = \frac{(w_a + w_s)}{2}$$

$$-1 \leq \rho(x,y) \leq 1$$

$$\text{Cov}(x,y) = \frac{1}{n}\sum_{j=1}^n (x_j - \bar{x})(y_j - \bar{y})$$

$$\sigma_x = \sqrt{\frac{X_T}{n} - \bar{x}^2}$$

$$\sigma_y = \sqrt{\frac{Y_T}{n} - \bar{y}^2}$$

Where:

$n$ = number of data points $x$ = amplitude of first $FRF$ $y$ = amplitude of second $FRF$ In the above equations, $\alpha$ represents the amplitude correlation between the frequency response functions being compared, $\rho$ represents the shape correlation between the functions, and $w_a$ and $w_s$ are weight coefficients for amplitude and shape, respectively. $S_{dB}$ is a scale factor in decibels. For example, for $S_{dB}=40$, $\alpha=0$ for frequency response functions having a 40 dB difference in amplitude.

Figure 1:
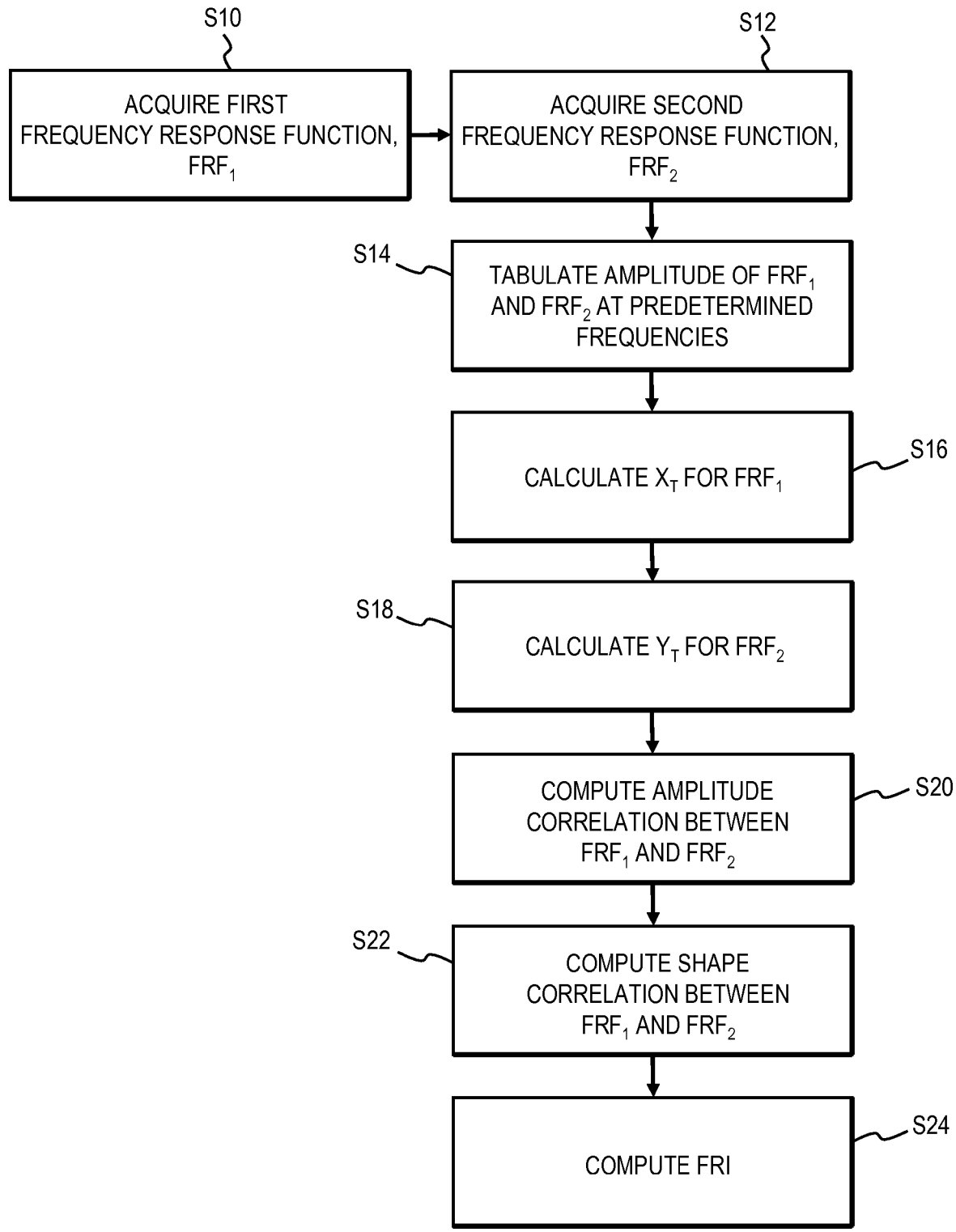
FIG. 1 is a flow diagram showing the steps of a process for measuring the correlation between two frequency response functions according to an embodiment of the present invention.

A process according to an embodiment of the present invention for measuring the correlation between two frequency response functions to compute a frequency response index is depicted in FIG. 1. At step S10 a first frequency response function, labeled $FRF_1$, is acquired. If $FRF_1$ is a computer simulation, $FRF_1$ will be a virtual model generated by a computer simulation system, such as an FEA analysis computer program. The resulting simulation may be presented or stored in any electronic or tangible form including, without limitation, printed matter, visual displays, and computer data storage media.

However, if $FRF_1$ is actual test data for a physical specimen of an item, the frequency response curve will be generated by test equipment such as, for example, vibration shakers and associated instrumentation. As a non-limiting example, a test item may be placed into an anechoic test chamber and configured to comply with predetermined, enforced boundary conditions, such as suspension of the test item on airbags or from elastic cables. Transducers, such as microphones, accelerometers and force transducers, are affixed to the test item at predetermined locations of interest and are coupled to a data acquisition system. An external forcing function, such as an electrodynamic shaker, modal hammer or speaker, is applied to the test item. The forcing function may take one or more of various forms including, without limitation, sinusoidal, random and impulse functions. The data acquisition system is configured to receive signals from the transducers, the signals corresponding in a predetermined manner to the response of the test item to the forcing function. Once the forcing function has been initiated the data acquisition system records the "time history" of all transducer signals, i.e., signal values with respect to time during the test period. The time history data is then processed using algorithms including, without limitation, a fast Fourier transform (FFT) to convert the time-domain data to frequency domain. $FRF_1$ is then calculated by dividing the response frequency spectrum (such as, for example, acceleration) by the reference spectrum (such as, for example, force). It should be noted that the disclosed invention may be advantageously utilized with any methods and equipment, now known or later developed, to acquire test data for a physical specimen of an item. Details of such methods and equipment are, accordingly, left to the artisan.

Other algorithms may also be utilized to minimize the effects of noise inherent in experimental measurements of physical specimens. For example, the autopower spectrum of the response may be divided by the crosspower spectrum of the reference and the response. In addition, the test may be repeated a number of times and the FRF results averaged in order to minimize random experimental error. The resulting FRF test data may be presented or stored in any electronic or tangible form including, without limitation, printed matter, visual displays, and computer data storage media.

At step S12 a second frequency response function, labeled $FRF_2$, is acquired. $FRF_2$ may be a computer simulation or test data for a physical specimen of an item obtained in the same manner as $FRF_1$.

At step S14 the data acquired at steps S10 and S12 are tabulated such that amplitude measurements for $FRF_1$ and $FRF_2$ at a predetermined number of corresponding frequency data points are listed. The accuracy of the FRI is generally proportional to the number of data points collected.

The tabulated data of step S14 is utilized at step S16 to calculate $X_T$ for $FRF_1$. $X_T$ is calculated as described above, i.e., $$X_T = \sum_1^n x_i^2.$$

Likewise, in step S18 $Y_T$ for $FRF_2$ is calculated as described above, i.e., $$Y_T = \sum_1^n y_i^2.$$

At step S20 the amplitude correlation $\alpha$ between $FRF_1$ and $FRF_2$ is computed in accordance with Equation 2, using in part the computed values of $X_T$ and $Y_T$. With regard to $S_{dB}$ of Equation 2, it is desirable to select an amplitude difference that equates to either about 50% or 0% correlation. For example, $S_{dB}$ equal to 40 dB may be selected such that an amplitude difference between $FRF_1$ and $FRF_2$ of 20 dB or 40 dB equates to a correlation of 50% or 0%, respectively. The computed amplitude correlation $\alpha$ may be output, i.e., presented or stored in any electronic or tangible form including, without limitation, printed matter, visual displays, and computer data storage media.

At step S22 the shape correlation $\rho$ between $FRF_1$ and $FRF_2$ is computed in accordance with Equation 3, using in part the computed values of $X_T$ and $Y_T$. The computed shape correlation $\rho$ may be output, i.e., presented or stored in any electronic or tangible form including, without limitation, printed matter, visual displays, and computer data storage media.

The value of amplitude correlation $\alpha$ and shape correlation $\rho$ will each range from 0 to 1. Values approaching 1 for both the amplitude correlation $\alpha$ and shape correlation $\rho$ indicate a high correspondence between the frequency response functions.

At step S24 the values of amplitude correlation $\alpha$ and shape correlation $\rho$ for experimental and/or simulated FRF data are entered into Equation 1 along with weighting values $w_a$ and $w_s$. With regard to coefficients $w_a$ and $w_s$, these weight factors provide latitude in placing greater importance on shape or amplitude correlation, depending upon the purpose of the comparison. For example, in some cases predicting the overall amplitude may be of greater importance than matching the shape of compared functions.

Equation 1 is solved to determine the FRI, which is a measure of the overall correspondence between $FRF_1$ and $FRF_2$. In some embodiments of the present invention Equation 1 may be programmed into a computer that is configured to receive the amplitude correlation $\alpha$ and shape correlation $\rho$, along with weighting values $w_a$ and $w_s$, and compute the FRI.

The value of FRI will range from 0 to 1. $S_{dB}$, $w_a$ and $w_s$ should be stated as a reference for a given FRI computation, in the same manner that a reference pressure is stated for sound pressure level notations in decibels.

The value of the FRI is directly proportional to the correspondence between $FRF_1$ and $FRF_2$ with regard to shape and/or amplitude. FRI values approaching 1 indicate a high correspondence between the frequency response functions, indicating that the virtual model is an accurate representation of the item. Conversely an FRI having a relatively low value indicates a low correspondence between frequency response functions. As an example, a low correspondence between a frequency response function of a virtual model and a frequency response function for a physical specimen of an item is an indication that the virtual model may not be sufficiently accurate to predict the characteristics of the item. In such cases the virtual model should be refined or examined for errors.

The values of amplitude correlation $\alpha$, shape correlation $\rho$ and FRI may be presented or stored in any electronic or tangible form including, without limitation, printed matter, visual displays, and computer data storage media.

EXAMPLES

Figure 2:
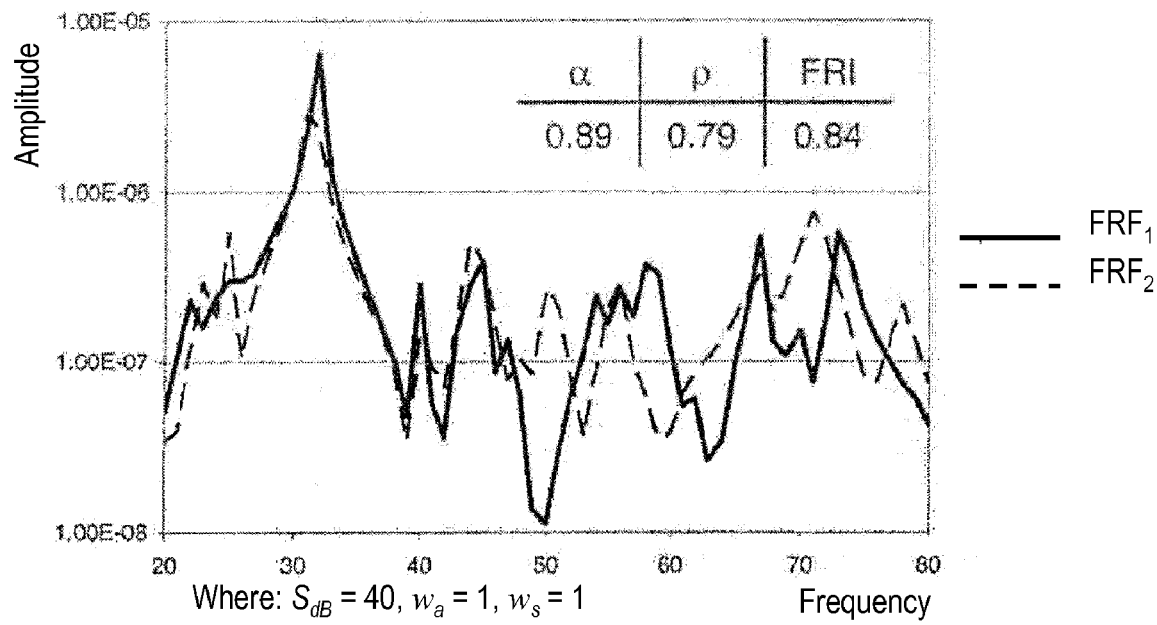
FIG. 2 is a graph of a first example measurement of a frequency response index.

In a first example, FIG. 2 illustrates a comparison between an $FRF_1$ and an $FRF_2$ wherein there is a relatively close correspondence between the response functions, even though the amplitude peaks of the functions are not generally aligned. The FRI for the example of FIG. 2 is relatively close to 1, indicating a high degree of correspondence between $FRF_1$ and $FRF_2$. In comparison, a FRAC analysis would not provide an accurate indication of the correspondence between the $FRF_1$ and $FRF_2$ of this example, due to the misalignment of the amplitude peaks.

Figure 3:
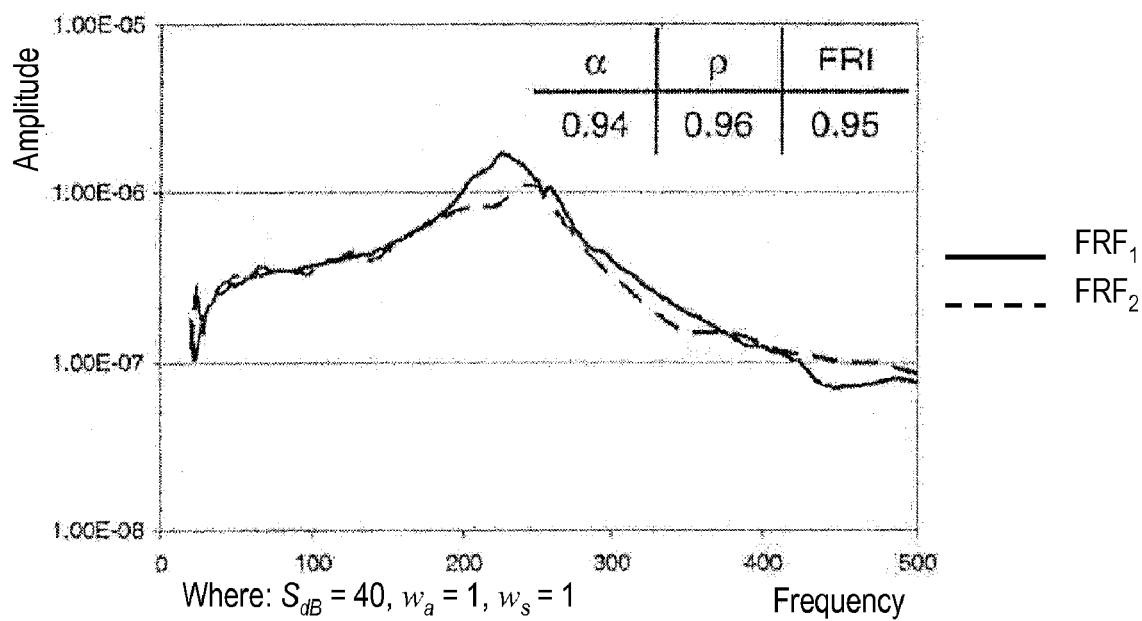
FIG. 3 is a graph of a second example measurement of a frequency response index.

In a second example, FIG. 3 shows a comparison between an $FRF_1$ and an $FRF_2$ wherein the two functions have a close correspondence in amplitude and shape, with only a few peaks. The FRI for the example of FIG. 3 is close to 1, indicating a high degree of correspondence between $FRF_1$ and $FRF_2$.

Figure 4:
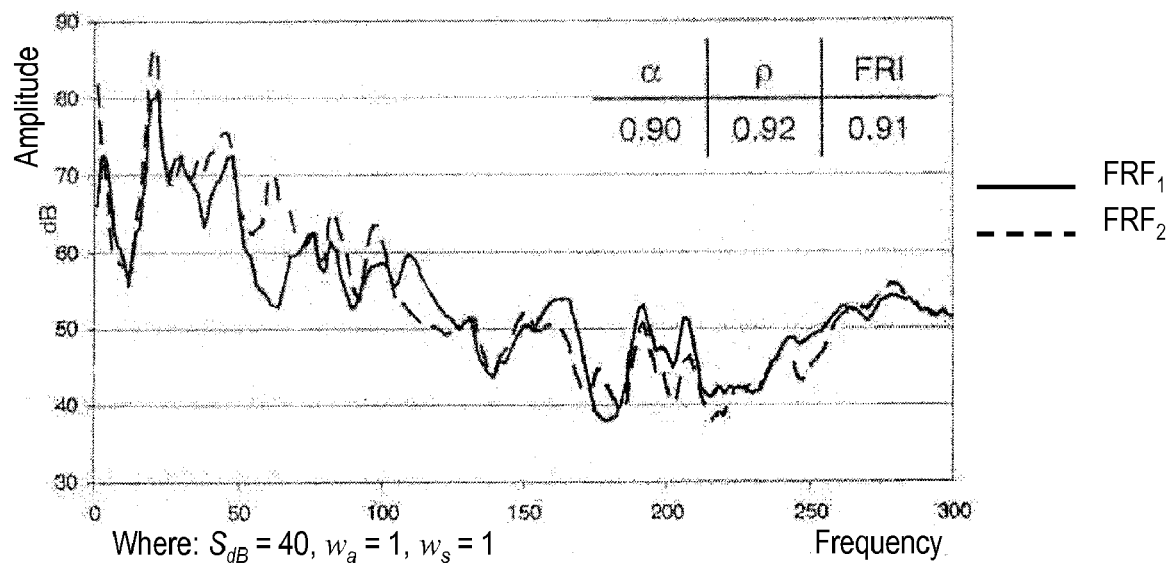
FIG. 4 is a graph of a third example measurement of a frequency response index.

In a third example, FIG. 4 depicts an $FRF_1$ and an $FRF_2$ wherein the two functions closely resemble each other in both amplitude and shape, each having a number of peaks which are not necessarily aligned. The FRI for the example of FIG. 4 is close to 1, indicating a high degree of correspondence between $FRF_1$ and $FRF_2$.

Figure 5:
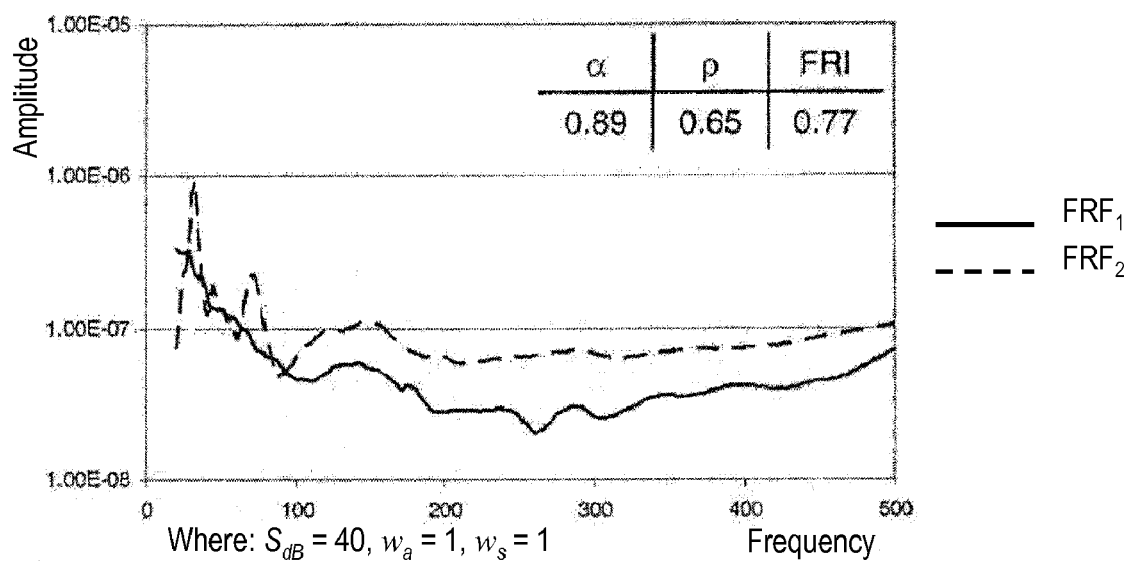
FIG. 5 is a graph of a fourth example measurement of a frequency response index.

In a fourth example, FIG. 5 shows a comparison between an $FRF_1$ and an $FRF_2$ wherein the two functions do not have a close correspondence in either amplitude or shape. As a result, the FRI is relatively low, indicating a low degree of correspondence between $FRF_1$ and $FRF_2$. Where one frequency response function is a virtual model and the other frequency response function is obtained from test data from a physical specimen of an item, it may be prudent to revisit the definition of the virtual model and attempt to improve the degree of correspondence, provided that the data for the response function resulting from testing of the physical specimen is accurate.

In general, frequency response functions and, in turn, frequency response indexes, are very useful for identifying the sensitivity of an item to loading conditions. This data can be used, for example, to detect and resolve design problems with a new product or to improve an established product.

Validation of a virtual model by measuring the FRI is particularly useful for providing an objective measure of the accuracy of the virtual model and, in turn, the accuracy of simulations that utilize the virtual model. As detailed above, virtual model validation is accomplished by measuring the FRI between the virtual model and corresponding actual test data for a physical specimen of the item being modeled. Once the virtual model has been validated, it can serve as a reliable tool for refining and testing the design of the item through simulation. It is recommended, however, that the FRI between the virtual model and a physical specimen be checked after substantial changes are made to the design of the item, in order to identify and eliminate any errors subsequently introduced into the virtual model as a result of the design changes.

FRI can also be used for process control, wherein test data for an exemplary specimen of an item is compared to test data for a sample item from a production run or lot. A high FRI value indicates a high degree of correspondence between the exemplary specimen and the sample, indicating that the sample conforms to the criteria established by the exemplary specimen. Conversely, a low FRI value may indicate that the process is producing non-conforming items.

FRI may also be utilized to measure the degree of correspondence between the frequency response functions of two virtual models. This may provide a general indication that an unproven virtual model, created for a particular item, is sufficiently similar to a proven virtual model created for a different item but having similar features. A relatively low FRI between the proven and unproven virtual models may be an indication that an error exists in the unproven virtual model.

FRI can also be utilized as a tool for validation of test simulations, such as life testing, vibration, crash-safety and stress. If a virtual model is shown through FRI to be sufficiently representative of an item, simulations using the virtual model are more likely to be generally representative of real-world results.

FRI may also be used as a target for computer optimization. For example, instead of minimizing the value of a simulated response data curve it may instead be desirable to minimize the FRI between a desired-response curve (i.e., a target) and the simulated response curve.

While this invention has been shown and described with respect to a detailed embodiment thereof, it will be understood by those skilled in the art that changes in form and detail thereof may be made without departing from the scope of the claims of the invention. For example, FRI may be adapted for use with any type of computer simulation equipment and/or computer program now known or hereafter invented. Likewise, FRI may be implemented in any computer language now known or hereafter invented, using any convenient software architecture, coding methodology, organization or structure. Furthermore, it should be noted that the process described herein is not limited to frequency response functions and may be applied to any x-y related data wherein a comparison of curve shape and logarithmic amplitude are desired.

What is claimed is:

1. A method for measuring correlation between frequency response functions, comprising the steps of:
    acquiring a first frequency response function and a second frequency response function;
    tabulating the amplitude of the first and second frequency response functions at a plurality of corresponding, predetermined frequency data points;
    computing the amplitude correlation between the first and second frequency response functions;
    computing the shape correlation between the first and second frequency response functions;
    computing a numerical frequency response index value from the computed amplitude correlation and the computed shape correlation; and
    outputting at least one of the computed frequency response index, amplitude correlation and shape correlation,
    the computed frequency response index value and amplitude and shape correlations providing an indication of the degree of correspondence between the first and second frequency response functions.

2. The method of claim 1, further comprising the step of selecting weighting values for the computation of the frequency response index.

3. The method of claim 1 wherein the value of the computed frequency response index is directly proportional to the degree of correspondence between the first and second frequency response functions.

4. The method of claim 1, further comprising the step of selecting a scale factor for the computation of the amplitude correlation.

5. The method of claim 1, further comprising the step of outputting at least one of the computed amplitude and shape correlations in at least one of a tangible or an electronic form.

6. The method of claim 5, further comprising the step of selecting at least one of printed matter, a visual display and computer data storage media as the output form.

7. The method of claim 1, further comprising the steps of:
    selecting a computer simulation for the first frequency response function; and
    selecting test data relating to a physical specimen for the second frequency response function.

8. The method of claim 7 wherein the degree of correspondence between the first and second frequency response functions provides an objective measure of the accuracy of a virtual model defined by the computer simulation.

9. The method of claim 7 wherein the computer simulation relates to at least one of a stress test, a life test, a vibration test and a crash-safety test.

10. The method of claim 7, further comprising the step of applying a forcing function to a physical specimen to generate the test data.

11. The method of claim 10 wherein the forcing function is one of a sinusoidal, random and impulse function.

12. The method of claim 1, further comprising the steps of:
    selecting test data relating to a first physical specimen for the first frequency response function; and
    selecting test data relating to a second physical specimen for the second frequency response function.

13. The method of claim 12 wherein the degree of correspondence between the first and second frequency response functions provides an objective measure of the conformity of a sample item to an exemplary item.

14. The method of claim 1, further comprising the steps of:
    selecting a first computer simulation for the first frequency response function; and
    selecting a second computer simulation for the second frequency response function.

15. The method of claim 14 wherein the degree of correspondence between the first and second frequency response functions provides an objective measure of the correlation between virtual models defined by the first and second computer simulations.

16. A method for measuring correlation between frequency response functions, comprising the steps of:
    acquiring a computer simulation for a first frequency response function;
    acquiring test data relating to a physical specimen for a second frequency response function;
    tabulating the amplitude of the first and second frequency response functions at a plurality of corresponding, predetermined frequency data points;
    computing the amplitude correlation between the first and second frequency response functions;
    computing the shape correlation between the first and second frequency response functions;
    computing a numerical frequency response index value from the computed amplitude correlation and the computed shape correlation; and
    outputting at least one of the computed amplitude correlation, shape correlation and frequency response index,
    the computed amplitude correlation, shape correlation and frequency response index value providing an indication of the degree of correspondence between the first and second frequency response functions.

17. The method of claim 16, further comprising the step of selecting weighting values for the computation of the frequency response index.

18. The method of claim 16 wherein the value of the computed frequency response index is directly proportional to the degree of correspondence between the first and second frequency response functions.

19. The method of claim 16, further comprising the step of selecting a scale factor for the computation of the amplitude correlation.

* * * * *